United States Patent [19]

Pidgeon

[11] Patent Number: 5,361,156
[45] Date of Patent: Nov. 1, 1994

[54] METHOD AND APPARATUS FOR PREDISTORTION

[75] Inventor: Rezin E. Pidgeon, Atlanta, Ga.

[73] Assignee: Scientific-Atlanta, Inc., Norcross, Ga.

[21] Appl. No.: 805,259

[22] Filed: Dec. 9, 1991

[51] Int. Cl.⁵ .......................................... H04B 10/18
[52] U.S. Cl. .................................. 359/161; 359/180; 359/188
[58] Field of Search ............... 359/161, 180, 187, 188, 359/173; 455/303–306, 3.1, 3.3, 3.4; 375/60; 328/163

[56] References Cited

U.S. PATENT DOCUMENTS

| | | | |
|---|---|---|---|
| 4,032,802 | 6/1977 | Pan | 307/311 |
| 4,045,675 | 8/1977 | Kingsley | 250/370 |
| 4,056,719 | 11/1977 | Waaben | 250/199 |
| 4,125,777 | 11/1978 | O'Brien | 250/551 |
| 4,211,979 | 7/1980 | Muraoka | 455/306 |
| 4,282,604 | 8/1981 | Jefferson | 455/602 |
| 4,316,141 | 2/1982 | Adolfsson | 324/96 |
| 4,330,764 | 5/1982 | Miedema | 455/305 |
| 4,345,482 | 8/1982 | Adolfsson | 73/862 |
| 4,378,496 | 3/1983 | Brogardh | 250/227 |
| 4,462,001 | 7/1984 | Girard | 375/60 |
| 4,600,847 | 7/1986 | Baum | 455/602 |
| 4,613,811 | 9/1986 | Vaerewyck | 324/96 |
| 4,654,891 | 3/1987 | Smith | 359/187 |
| 4,709,154 | 11/1987 | Rademaker | 250/551 |
| 4,832,433 | 5/1989 | de La Chapelle | 359/173 |
| 4,868,895 | 9/1989 | Hershberger | 359/180 |
| 4,908,581 | 3/1990 | Honjo | 455/305 |
| 4,930,141 | 5/1990 | Ohmagari | 375/60 |
| 4,989,262 | 1/1991 | Saito | 455/305 |
| 4,992,754 | 2/1991 | Blauvelt | 328/163 |
| 5,005,937 | 4/1991 | Aida | 359/179 |
| 5,210,633 | 5/1993 | Trisno | 359/194 |

FOREIGN PATENT DOCUMENTS 0524758 1/1993 European Pat. Off. ............ 359/181

OTHER PUBLICATIONS

M. Bertelsmeier, "Linearization of Broadband Optical Transmission Systems by Adaptive Predistortion", Frequenz Sep. 1984 pp. 206–212.

"Predistortion Linearization of Directly Modulated DFB Lasers and External Modulators for AM Video Transmission" Childs, et al., OFC '90.

"Feasibility of Multi–Channel VSB/AM Transmission on Fiber Optic Links", J. Koscinski, *NCTA Technical Papers* (1987), p. 24.

"Linearization of Multichannel Analog Optical Transmitters by Quasi–Feedforward Compensation Technique", Patterson, et al., *IEEE Transactions on Communications,* vol. Com. 27, No. 3 (Mar. 1979) pp. 582–588.

"Phase–Shift Modulcation Technique for the Linearisation of Analogue Optical Transmitters", Strals, et al., *Electronics Letters,* (Mar. 3, 1977, vol. 13, No. 5) pp. 149–151.

"Analog Transmission of TV–Channels on Optical Fibers, with Non–Linearities Correction by Regulated Feedforward," Franckart, et al., ECOC 83–9th European Conference on Optical Communication, Elsevier Science Publishers B.V., North Holland (1983) pp. 347–350.

(List continued on next page.)

*Primary Examiner*—Leslie Pascal
*Attorney, Agent, or Firm*—Frederick W. Powers, III; Steven C. Stewart

[57] ABSTRACT

A predistortion circuit for an optical communications system includes a main path and a predistortion path for an RF modulating signal which are independently level adjusted and impedance matched to a laser diode. The distortion path includes a distortion generator which generates a distortion signal which is substantially the same as the distortion generated by the modulation of the transmission system. The distortion path further includes an in phase adjustment leg for overall amplitude adjustment and amplitude adjustment as a function of frequency and a quadrature adjustment leg for phase adjustment as a function of frequency. Temperature compensation is provided to the adjustment networks to stabilize the gain elements of each for ambient temperature changes.

44 Claims, 8 Drawing Sheets

OTHER PUBLICATIONS

"Linearization of Light Emitting and Laser Diodes for Analog Broadband Applications by Adaptive Predistortion", Bertelsmeier, et al., Technical University, Merckstr, 25 D-6100 Darmstadt, DRF pp. 378-379.

"Nonlinearity and Its Compensation of Semiconductor Laser Diodes for Analog Intensity Modulcation Systems," Asatani, *IEEE Transaction on Communications*, (Feb. 1980), pp. 297-300.

"Linearization of Optical Transmitters by a Quasifeedforward Compensation Technique," Straus, et al., *Electronics Letters*, (Mar. 17, 1977), vol. 13, No. 6) pp. 158-159.

"Linearization of LED Nonlinearity by Predistortions," Asatani, et al., *IEEE Transactions on Electronic Devices*, vol. ED-25, No. 2 (Feb. 1978) pp. 207-212.

"Status of 1550 nm Analog Fiber Optic systems and Performance Advantages," Pidgeon, et al., Technical Papers, SCTE Conference, Orlando, Fla. (Jan. 1991).

"Subcarrier Multiplexed Lighwave System Design Considerations for Subscriber Loop Applications," Way, *IEEE Journal of Lightwave Technology*, vol. 7, No. 11 (Nov. 1989) 1809-1810.

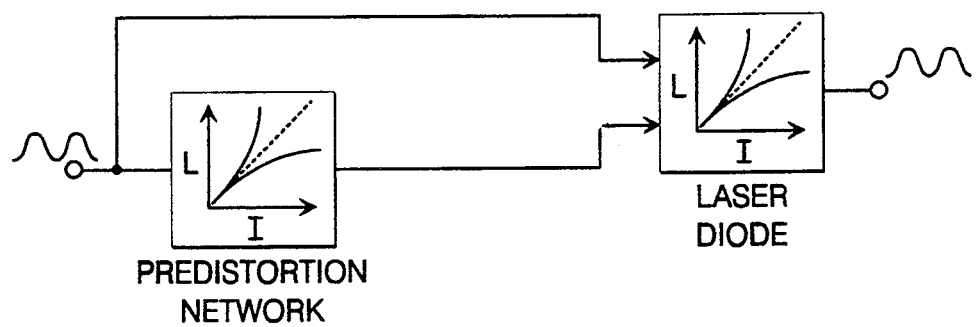
FIG. 5
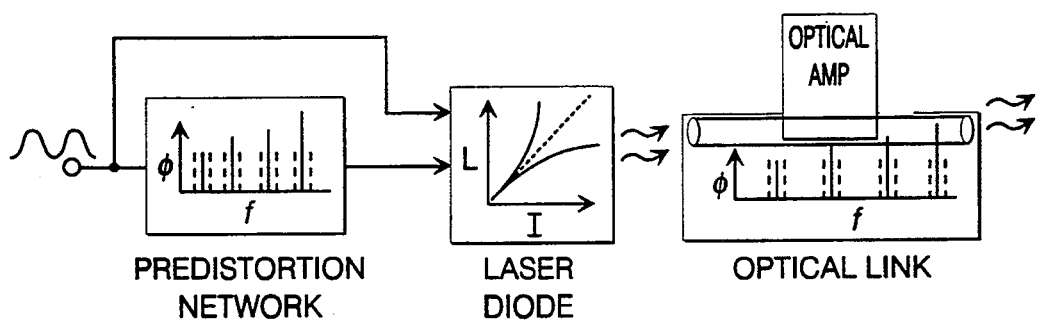
FIG. 6
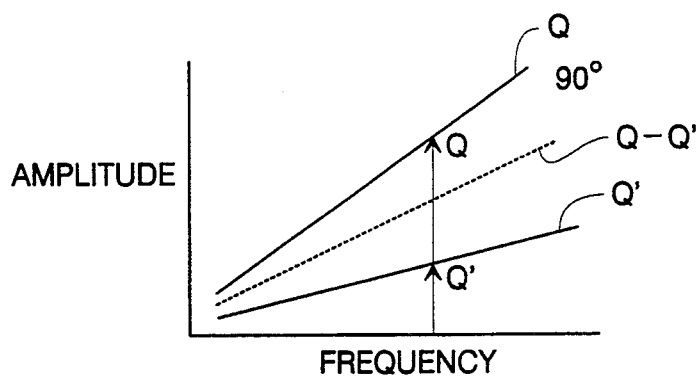
FIG. 6A
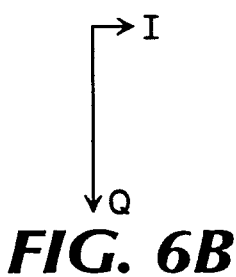 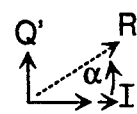 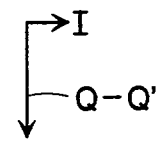
FIG. 6B  FIG. 6C  FIG. 6D

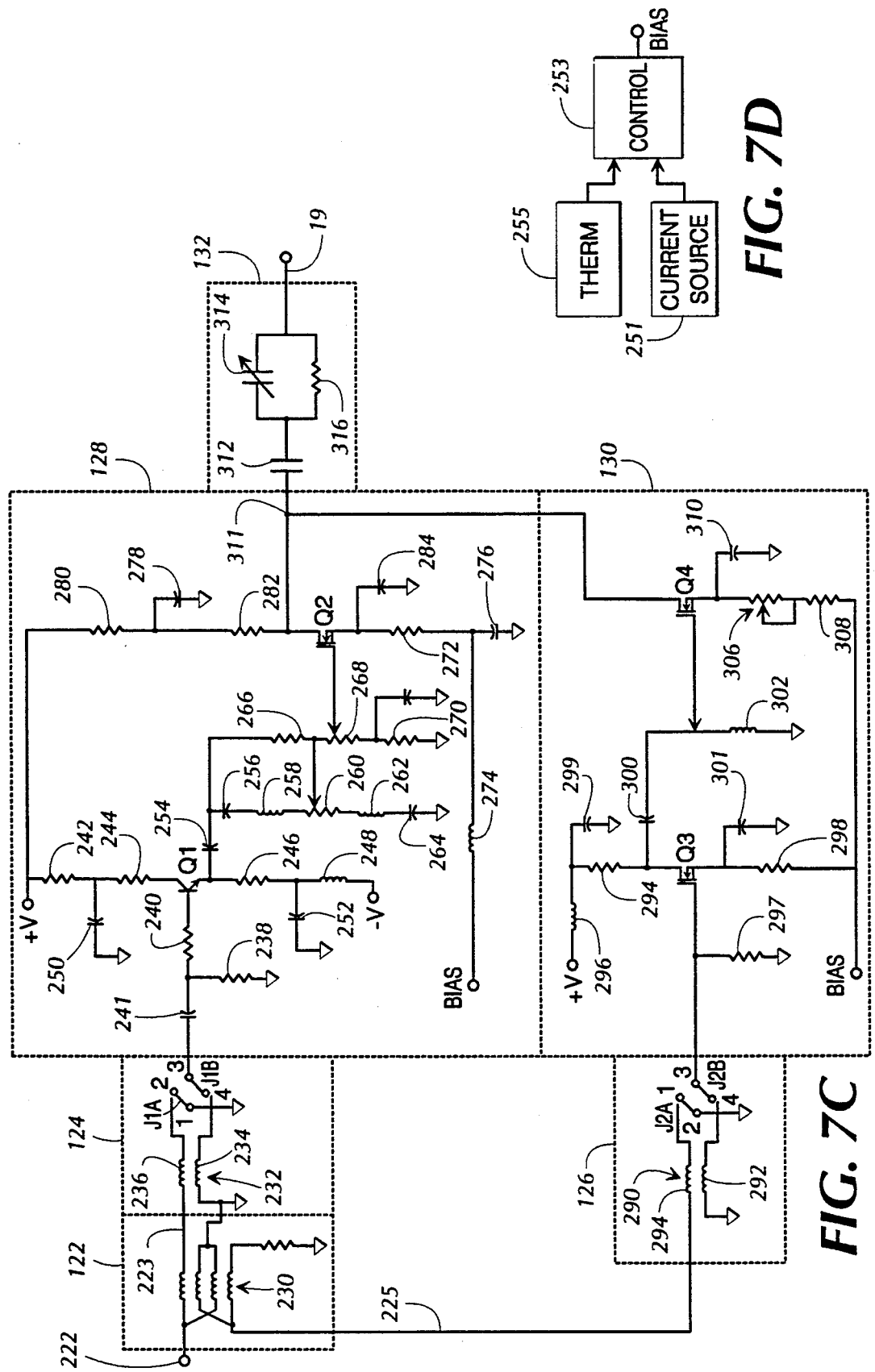

METHOD AND APPARATUS FOR PREDISTORTION

BACKGROUND OF THE INVENTION

1. Field of the Invention

The invention pertains generally to the linearization of nonlinear optical transmission systems by the generation of a compensation signal and is more particularly directed to method and apparatus for compensating the nonlinearities of an optical transmission system comprising at least one of a semiconductor laser, an optical amplifier, and an optical fiber communications link by the generation of a predistortion signal.

2. Description of the Prior Art

Optical communications systems which include a semiconductor laser, an optical fiber communication link, and an optical receiver are well known in the art. These communications systems are adapted to carry a wide range of information including voice, video, and data.

The typical optical communications system includes a laser transmitter which converts an RF information signal from an electrical signal to an optical signal. The optical signal is then carried over an optical fiber communications link where it is converted back to an electrical signal by a photodetector of an optical receiver. The transmission scheme may be analog or digital and the modulation scheme amplitude, phase, or frequency, or any combination of the above.

One of the most advantageous optical communications systems from the viewpoint of simplicity and bandwidth considerations is an analog scheme where the optical intensity of a semiconductor laser is amplitude modulated. The optical transmission system, including the semiconductor laser, optionally an optical amplifier, and optical fiber communications link, is required to transduce the electrical information signal linearly into an optical signal and to transmit the optical signal linearly over the optical fiber communication link. In general, the distortions caused by the transmission system cause the system to operate in less than the optimum manner. Increasingly, this type of optical communications system is playing an important role in the delivery of high quality signals in all types of CATV architectures.

Distortion in optical transmission systems can originate from several different sources. One of the primary sources is the electrical to optical transducer, a laser diode in most systems. Another contributor is the optical communications link and, more recently, any optical amplifier in the optical link. Some of these sources produce similar distortion signals which may even cancel others, but usually each distortion has its own unique characteristics and should be compensated for independently.

A laser diode generally exhibits at least three different types of identifiable distortion. The first type is generally at that caused by the non-linearities of its LI (light intensity as a function of electrical current) transfer function. In general, the non-linearity of the LI transfer function is similar to the function $y=x^2$. The non-linearity may be superlinear (L increases at increasing rates for increases in I), or it may be sublinear (L increases at decreasing rates for increases in I). The next type of laser diode distortion is mainly second order and higher intermodulation products. This type of distortion can be corrected by generating a distortion signal which is generally similar (sum and difference beats of the carrier frequencies) with a similar amplitude but opposite phase. Another characteristic distortion of the laser diode is where the amplitude and phase of the modulating signal is distorted as a function of frequency changes. To correct for such a distortion, a compensation signal which varies in amplitude and phase as a function of frequency is advantageous.

The distortion generated by an optical link is generally caused by phase and amplitude dispersion. Generally, phase dispersion causes the different modulating frequencies of an optical signal to be phase shifted different amounts. Dispersion is also a function of the length of the optical link and generates different amplitudes for the modulating frequencies. Present optical communications systems use a 1330 nm. optical wavelength signal to minimize phase dispersion. However, newer systems that operate at a 1550 nm. optical wavelength are capable of minimizing amplitude signal losses but with effect of increasing phase dispersion. It would be advantageous to compensate for the increased phase dispersion of the 1550 nm. system while maintaining its lower optical loss. Optical amplifiers, particularly Erbium doped fiber amplifiers (EDFA), allow greater lengths of the optical fibers to be used without the loss of optical signal amplitude, but produce their own distortion in the form of a amplitude versus frequency characteristic.

A compensation signal to compensate for distortion in the optical link and any optical amplifier should have an amplitude versus frequency characteristic and the ability to apply it at different phases of the signal. Advantageously, the amplitude versus frequency characteristic should be independent of any amplitude versus frequency compensation signal for the laser diode as the distortion characteristic which is generated by each respective element is considerably different.

SUMMARY OF THE INVENTION

The invention provides a method and an apparatus for the compensation of a nonlinear optical transmission system. In a preferred embodiment, the transmission system can be used for the carriage of a broadband television signal for a CATV system. The optical transmission system includes a semiconductor laser which acts as an electrical signal to optical signal transducer, optionally a fiber amplifier which increases the optical signal strength, and an optical communications link which carries the optical signal to an optical receiver. The compensation method and apparatus includes the generation of a predistortion signal which can compensate for the non-linearities of at least one, and preferably all, of the elements of the optical transmission system.

Therefore, it is an object of the invention to provide a compensation signal for a non-linear optical transmission system.

It is a further object of the invention to provide a compensation signal for at least one, and preferably all, of a laser diode, an optical amplifier, and an optical communications link.

It is a further object of the invention to provide a compensation signal for a laser diode which corrects at least one, and preferably all, of LI nonlinearities, second order intermodulation effects, and amplitude and phase nonlinearities as a function of frequency.

It is a further object of the invention to provide a compensation signal for an optical fiber which corrects at least one, and preferably all, of phase and amplitude dispersion.

It is a further object of the invention to provide a compensation signal for optical amplifier of the EDFA type which corrects for amplitude nonlinearities as a function of frequency.

The predistortion apparatus includes a main path which carries most of the RF modulating signal for the laser diode and a distortion path for generating the compensation signal from a portion of the RF modulating signal. The distortion path, in the preferred implementation, comprises a distortion generator and adjustment networks for adjusting the distortion generated by the distortion generator for the best overall match to the actual distortion.

The distortion path includes a distortion generator and adjustment networks which, from an RF input modulating signal, generate a distortion signal of the same general type as the distortion inherently produced in the optical transmission system. For a laser diode this is a correction for the LI transfer function, second order intermodulation effects, and amplitude and phase compensation as a function of frequency. For the optical communications link, amplitude and phase dispersion is the primary distortion driver. For an optical amplifier, particularly an EDFA, amplitude compensation as a function of frequency is necessary.

In a preferred implementation, the distortion generator includes a hybrid transformer which has a pair of conjugate ports which are isolated from one another and a pair of ports which are phased at 0° and 180°, respectively to an input port. A nonlinear two terminal device, preferably a diode, is used to terminate each antiphased port. The nonlinear devices are driven by a bias current and modulated by the input signal to produce distortion. The current in each of the nonlinear devices is an exponential function of the RF voltage across it which can be expressed as a power series. Since the nonlinear devices are driven in antiphase, the odd order currents are also antiphase and add at one conjugate port while the even order currents are inphase and add at the other conjugate port. This produces a distortion signal which is of the form $y = x^2$ and substantially comprises second order distortion components with other even ordered components, with the fundamental and odd ordered components suppressed.

According to one aspect of the invention, the predistortion signal is adjusted in amplitude and phase for cancellation of the distortion generated by the optical transmission system. The predistortion signal is split into an inphase leg and a quadrature phase leg which are then combined to generate an adjusted distortion signal. The inphase leg produces an amplitude adjustment as a function of frequency for compensation of similar distortion in either the laser diode or an optical amplifier. The quadrature phase leg produces a phase and amplitude as a function of frequency adjustment for the dispersion of the optical link. Additionally, the quadrature phase leg is adapted to produce a phase as a function of frequency adjustment for the laser diode. By combining the different signals of the quadrature leg with the inphase path, variable degrees of amplitude and phase adjustment can be made. Further, the phase adjustment is produced independent of the amplitude adjustment.

The outputs of the inphase leg and the quadrature phase leg include buffer amplifiers for linearity and isolation of the adjustment circuitry. In one embodiment, the buffer amplifier outputs are thermally compensated for gain stability and for variation in supply voltage. The thermal compensation is provided by a temperature sensitive regulator which regulates the output current of the buffer amplifiers. In a second embodiment, the currents of the buffer amplifiers are controlled by closed loops which provide adjustable stable gains for the devices.

According to another aspect of the invention, the input of the distortion signal to the inphase leg and the quadrature phase leg can be inverted by switching them 180°. This inversion feature allows the compensation of the distortion of the laser diode whether it be sublinear or superlinear and the independent compensation of the phase distortion whether it be leading or lagging.

According to still another aspect of the invention, the main path signal is coupled to the semiconductor laser through a matching network. The matching network matches the low impedance of the semiconductor laser to a nominal source impedance, for example, 75 Ohms. The output of the predistortion network is also coupled through a separate matching circuit which matches the low impedance of the semiconductor laser to a nominal source impedance, for example, 75 Ohms. Feeding the diode laser with the main path and the predistortion path outputs through separate matching networks eliminates any additional through loss of other methods of coupling these signals, such as by a directional coupler, and thereby lessens the signal power dissipated by the predistortion network.

BRIEF DESCRIPTION OF THE DRAWINGS

These and other objects, features, and aspects of the invention will be better understood from a reading of the following detailed description in conjunction with the drawings in which:

FIG. 5 is a block diagram of the transfer function for the predistortion circuit and laser diode illustrated in FIG. 1;

FIG. 6 is a block diagram of the transfer function for the predistortion circuit and the communications link illustrated in FIG. 1;

FIG. 6A–6D are graphical representations of functions provided by the embodiments of the distortion signal adjustment networks illustrated in FIGS. 2 and 3;

FIGS. 7A–7D are detailed schematic block diagrams of the networks forming the predistortion circuit illustrated in FIG. 2.

DETAILED DESCRIPTION OF THE PREFERRED EMBODIMENT

Figure 1:
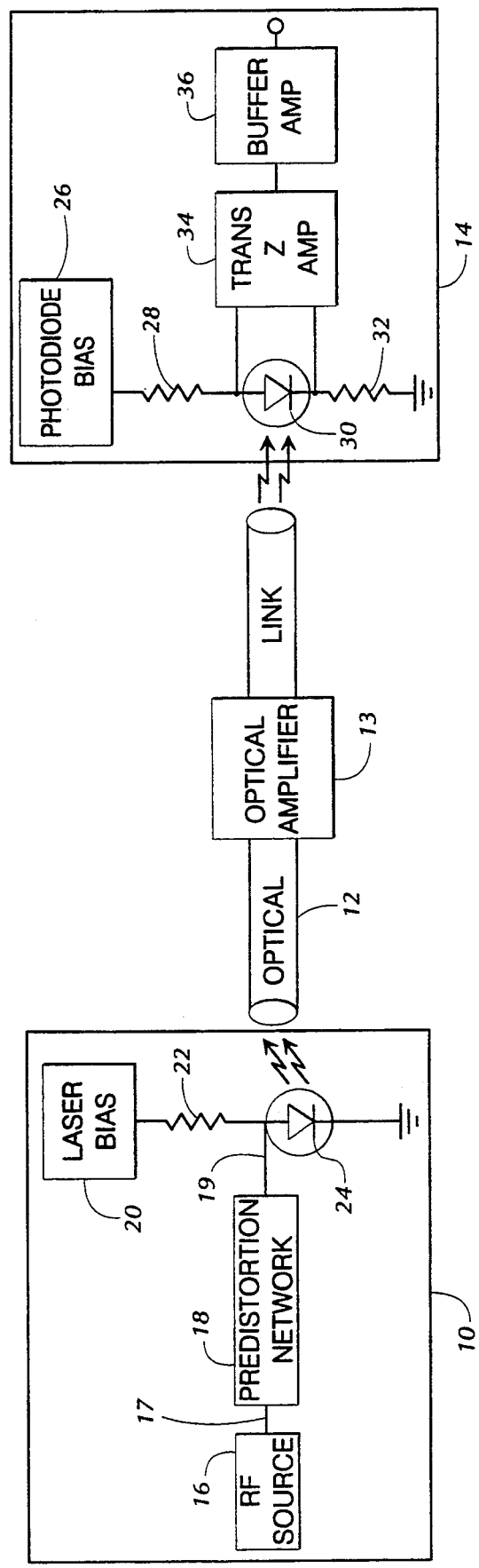
FIG. 1 is a system block diagram of an optical communications system having a predistortion circuit for a laser transmitter, optical amplifier, and fiber link which is constructed in accordance with the invention.

With reference now to the drawings, FIG. 1 is a system block diagram of an optical communications system constructed in accordance with the invention. The optical communications system comprises an optical transmitter 10 which transmits information over an optical communications link 12, generally an optical fiber, to an optical receiver 14. The optical link can optionally include an optical amplifier 13 of the Erbium doped fiber type. The optical transmitter 10 has an RF source 16 which provides a modulation signal to a laser diode 24. The modulation signal, preferably a broadband CATV signal, modulates the optical intensity of the output of the laser diode 24 by varying the bias current input to the diode 24 from a laser bias source 20 through a current limiting resistor 22. The optical output from the laser diode 24 is then coupled to the optical link 12 for transmission to the optical receiver 14.

The optical receiver 14 includes a photo-detector 30, for example, a PIN photodiode, which transduces the intensity modulated optical signal into an amplitude modulated electrical current signal. The photo-detector 30 is generally reverse biased by a second photodiode bias source 26 through current limiting resistors 28 and 32. Differential current signals are taken from the anode terminal and cathode terminal of the photo-detector 30 for input to a transimpedance amplifier 34. The amplifier 34, which may have a push pull configuration, transforms the electrical current signals into an amplitude modulated voltage signal similar to that input from the RF source 16 at the transmitter 10. This AM signal is then amplified to a suitable level by buffer amplifier 36 and output for further processing or distribution to a multiplicity of CATV subscribers.

Before the RF modulation signal is applied to the laser diode 24, it is sampled and processed by a predistortion network 18. The predistortion network 18 generates a predistortion signal of substantially the same amplitudes and frequencies, but of opposite phases to the distortion that the modulation signal expects because of the modulation process. By modulating the laser diode 24 with both the modulation signal and the predistortion signal, the distortion caused by the transmission process may be canceled and the system linearized.

The predistortion network 18 compensates for the nonlinearities of the transmission system of the optical transmission system which includes the laser diode 24, optionally the EDFA 13, and the optical link 12. The distortions most prevalently caused by the laser diode 24 are the LI non-linearity, second order intermodulation products, and amplitude and phase distortion as a function of frequency. The distortion most prevalently caused by the optical link 12 is amplitude and phase dispersion. The distortion most prevalently caused by the EDFA 13 is amplitude distortion as a function of frequency.

Figure 2:
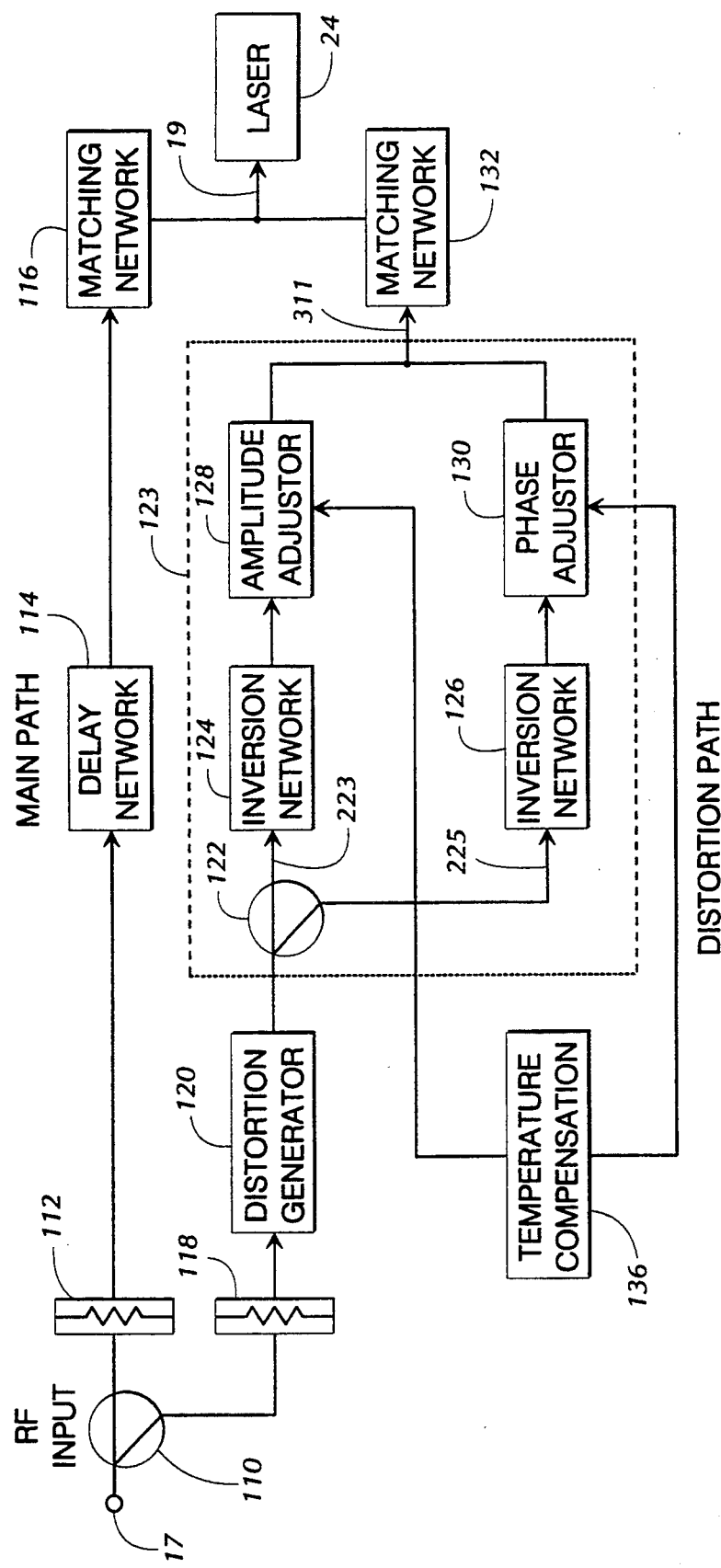
FIG. 2 is a functional block diagram of a first embodiment of the predistortion circuit illustrated in FIG. 1.

FIG. 2 is a functional block diagram of the predistortion network 18 illustrated in FIG. 1 where the network is connected to the RF source at terminal 17 and feeds the laser diode at terminal 19. The RF modulating signal is split into two paths by a directional coupler 110 with most of the power of the signal being transmitted through a main path and a much smaller portion being transmitted through a distortion path. The main path comprises a plug-in resistive pad 112, a delay network 114, and a matching network 116. The resistive pad 112 sets the level of the RF modulating signal in the main path for a desired modulation index for the laser diode. The delay network 114, which can be a predetermined length of coaxial cable, is used for delaying the main path signal by substantially the same amount of time caused by the transit of the RF modulation signal through the distortion path. The matching network 116 matches the output impedance of the delay network 114 to the low input impedance of the laser diode 24.

The distortion path comprises a plug-in resistive pad 118, a distortion generator 120, distortion signal adjustment networks 123, and a matching network 132. The pad 118 is used to set the level of the sample of modulation signal such that the distortion path will provide a distortion signal of substantially the same amplitude as the distortion caused by the transmission system. The distortion generator 120 then distorts the sample of the input modulation signal in a similar manner as the optical transmission system distorts the main path signal. Independent adjustments to the phase and amplitude of the distortion signal are made with the adjustment networks 123 and the signal is input to the matching network 132. The matching network 132 matches the output impedance of the networks 123 to the low input impedance of the laser diode 24.

To produce a distortion signal having the same phase and amplitude but opposite in sense (180 degrees out-of-phase) so as to cancel the distortion caused by the optical transmission system, adjustments to the distortion signal are made by the distortion signal adjustment networks 123. In a first embodiment, the networks 123 include two legs specifically, an inphase leg and a quadrature leg. The separate legs are fed from a directional coupler 112 which splits the distortion signal generated from the distortion generator 120. One portion of the distortion signal passes through the inphase leg which comprises an inversion network 124 and an amplitude adjustment network 128. Another portion of the distortion signal passes through the quadrature leg which comprises an inversion network 126 and a phase adjustment network 130.

The inversion network 124 provides the correct sense for the distortion signal such that it will cancel the distortion generated in the transmission system. Generally, this is necessary because the LI curve of the laser diode 24 may be sublinear or superlinear. The amplitude of the distortion signal is then adjusted as a function of frequency. The quadrature leg is independent of this adjustment and produces a phase adjustment signal whose overall amplitude can be varied by the phase adjustment network 130. The phase adjustment signal is combined with the amplitude adjusted signal from network 128 to produce a phase and amplitude adjusted distortion signal for input to the matching network 132. The inversion network 126 permits the correct sense of the distortion signal to be chosen so that the phase adjustment can be leading or lagging.

The adjustment networks 128 and 130 contain elements whose gains vary as a function of temperature. To maintain a predetermined gain from these elements, a temperature compensation circuit 136 is provided. The temperature compensation circuit 136 measures the ambient temperature with a temperature responsive sensor and adjusts the bias current and operating point of the temperature sensitive devices accordingly.

Figure 3:
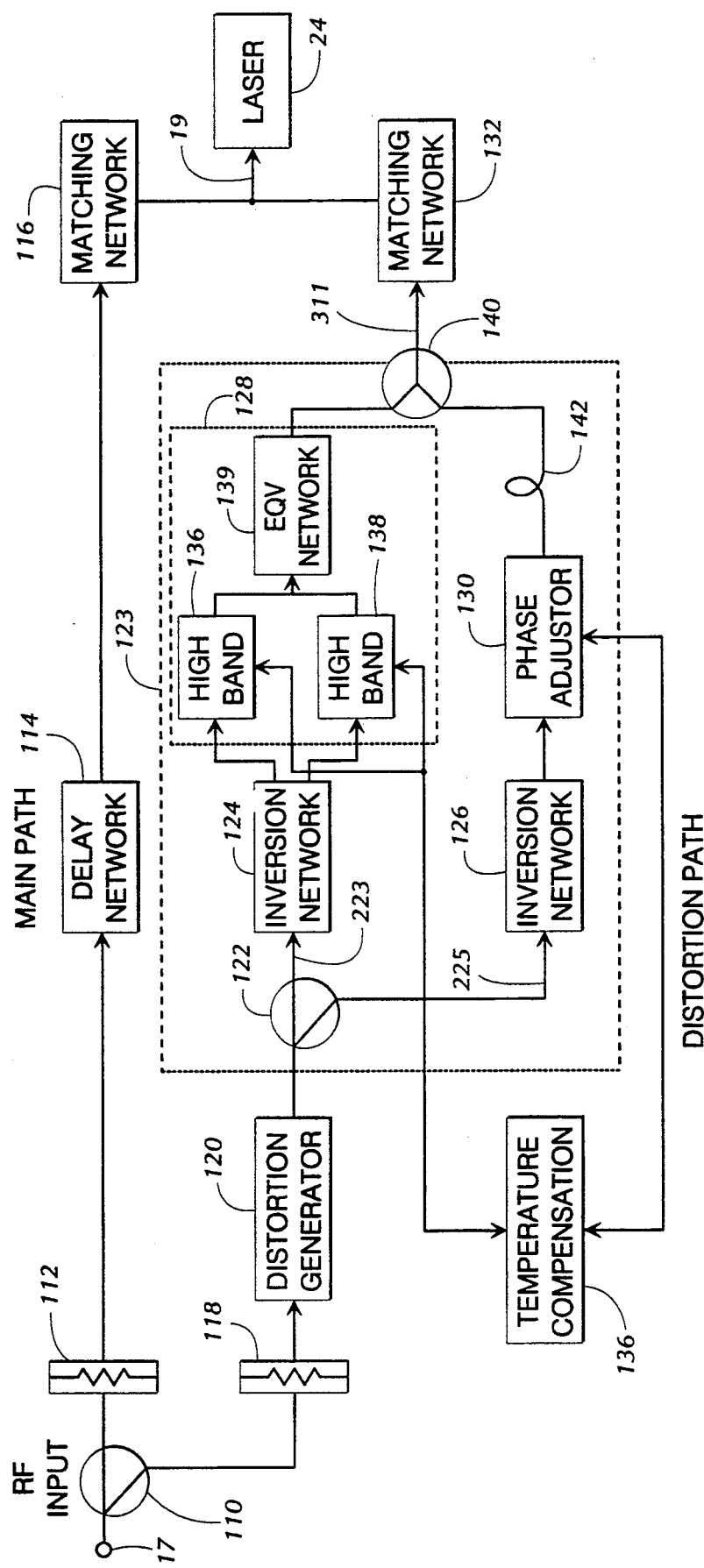
FIG. 3 is a functional block diagram of a second embodiment of the predistortion circuit illustrated in FIG. 1.

FIG. 3 is a functional block diagram of a second embodiment of the predistortion network 18 constructed in accordance with the invention. In the illustrated embodiment, elements which perform similar functions to that of the embodiment illustrated in FIG. 2 are referenced with like numerals. The second embodiment differs from the first embodiment mainly in the configuration of the distortion signal adjustment networks 123. Particularly, the amplitude adjustment network 128 comprises a diplex filter arrangement where an amplitude adjustment as a function of frequency is made with a high band filter 136 and with a low band filter 138. The inversion network 124 which feeds the high and low band filter networks 136, 138 has a dual output and is therefore different in structure but similar in function to the inversion network 124 of FIG. 1. The amplitude adjustment network 128 also includes an equalization network 139 which smoothly combines the outputs from the high band filter 136 and the low band filter 138. The quadrature leg in the distortion signal adjustment networks 123 contains an inversion network 126 and a phase adjustment network 130 similar in function to those elements found in FIG. 2. The outputs of the amplitude adjustment network 128 and the phase adjustment network 130 are combined in a directional combiner 140 before being input to matching network 132. A delay network 142, formed by a length of coaxial cable, equalizes the delay that is seen in the quadrature leg to that of the inphase leg because of the equalization network 139.

Figure 4:
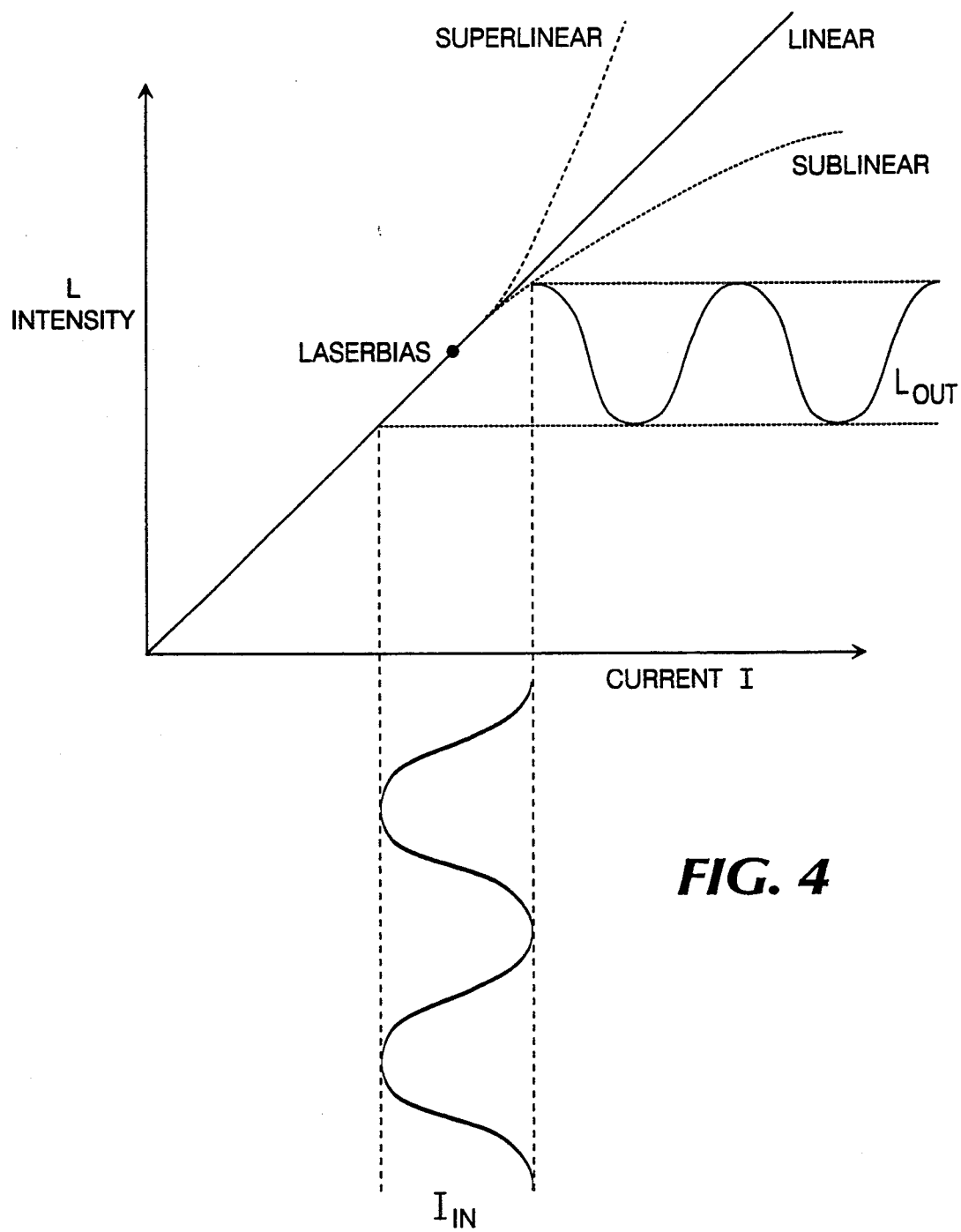
FIG. 4 is a graphical representation of the light intensity output L of the laser diode illustrated in FIG. 1 as a function of input current I, i.e., the LI characteristic of the laser diode.

FIG. 4 illustrates a typical operating curve, LI characteristic, for a laser diode in an amplitude modulated CATV communications system. The laser diode converts an RF input current $I_{in}$ into an optical intensity output $L_{out}$. Ideally, the optical output intensity varies linearly with the variations in the amplitude of the input current. No actual laser diode, however, is an ideal device and the operating curve for each is typically that shown by the dotted lines illustrating either a superlinear or a sublinear curve. The deviation of the actual curves from the ideal linear curve produces distortion of the intensity of the light output and a corresponding deviation in the detected signal at the optical receiver. The distortion is similar to a square law curve, $y=x^2$, and can be compensated, by a distortion signal of similar shape but of opposite sense. As will be more fully described herein, the distortion generator generates a distortion signal with such square law characteristics.

In FIG. 5, it is illustrated that the predistortion network 18 varies the input signal oppositely to the distortion provided by the laser diode to cancel the distortion. The block diagram illustrates the modulation signal is input to the laser diode directly which causes actual distortion and is further input to the predistortion network to generate a distortion signal with which to additionally modulate the laser diode. The distortion signal, when combined with the original modulation signal during the modulation process in the laser diode, substantially cancels the distortion produced by the laser diode. While the distortion shown is for the laser diode is only the LI non-linearity, it is understood that the laser diode distortion which can be compensated for is the LI characteristic, second order intermodulation effects, and amplitude and phase variations as a function of frequency.

However, as seen in FIG. 6, there is additional distortion in an optical transmission system where the optical link produces amplitude and phase dispersion. For every modulating frequency that is carried by the optical fiber, there is a different delay and attenuation caused by the physics of the transportation of photons (light). In the figure it is illustrated that the predistortion network varies the input signal oppositely to the distortion provided by the optical link to cancel the distortion. The block diagram illustrates the modulation signal is input to the laser diode, an optional optical amplifier, and optical link directly which causes actual distortion and is further input to the predistortion network to generate a distortion signal with which to additionally modulate the laser diode. The distortion signal, when combined with the original modulation signal during the modulation and transmission process, substantially cancels the distortion produced by the optical amplifier and optical link. While the distortion shown is only the phase dispersion and amplitude dispersion of the optical link, it is understood that the distortion which can be compensated for also includes the amplitude versus frequency distortion of the optical amplifier.

The predistortion network 18 comprises a phase adjustment network to compensate for this effect. In general, amplitude dispersion for the optical link increases as a function of frequency and the phase dispersion is approximately 90° for the case of a 1550 nm. CATV system. The phase adjustment network comprises basically a phase shifter which shifts the distortion signal 90° in phase and provides an amplitude and phase adjustment based on frequency. In FIG. 6A there is shown a generalized amplitude as a function of frequency response for the phase adjustment network. The response Is similar to that of a differentiator in that the amplitude of the distortion signal is frequency dependent and leads the original signal by 90°. Also, because of the 90° phase lead, this part of the circuit is termed the quadrature leg. The phase adjustment network provides a distortion signal 90° leading in phase which will substantially correct the amplitude and phase dispersion of the optical communications link.

FIG. 6B illustrates the combined signals of the inphase leg and the quadrature leg of the adjustment networks 123. The vector I represents the amplitude of a distortion component of a particular frequency of the distortion signal which is in phase with the distortion signal and the vector Q represents the amplitude of the distortion component of the same frequency which is 90° leading. The particular amplitude relationship of the vectors is shown only for illustration. The inphase vectors I correct for amplitude distortions of the laser diode as a function of frequency while the quadrature phase vectors Q correct for the amplitude dispersion and phase dispersion of the optical link. It is noted that these two functions are advantageously independent because the amplitude versus frequency characteristics of the separate distortions are quite different.

Further, the laser diode may exhibit phase distortion as a function of frequency which can also be compensated by this technique. The discussion with respect to FIG. 6B assumed there was no phase versus frequency distortion present which was caused by the laser diode. If there is phase distortion present, the phase adjustment network can be used to compensate for that distortion. In FIG. 6C, the I vectors and Q' vectors can be understood to produce a resultant vector R which is the inphase vector I phase shifted a phase angle alpha as a result of a vector combination. Because there is a Q' for every I (the distortion signals in the inphase leg and the quadrature phase leg contain the same frequencies), the phase versus frequency function which results will be entirely dependent on the amplitude versus frequency function for the Q' vectors (FIG. 6A). It is evident that the amplitude versus frequency function can be easily varied to compensate for the amplitude versus frequency distortion caused by the laser diode.

In addition, these techniques can be used simultaneously to compensate for both the phase and amplitude dispersion of the optical link and the phase distortion of the laser diode. The Q vectors and the Q' vectors can be added or subtracted to produce a composite vector $Q \pm Q'$ as shown in FIG. 6D which when combined with the I vectors provide both compensations simultaneously. The manner in which this is done is to generate the particular amplitude function in FIG. 6A which generates the desired function $f(Q \pm Q')$.

Figure 7A:
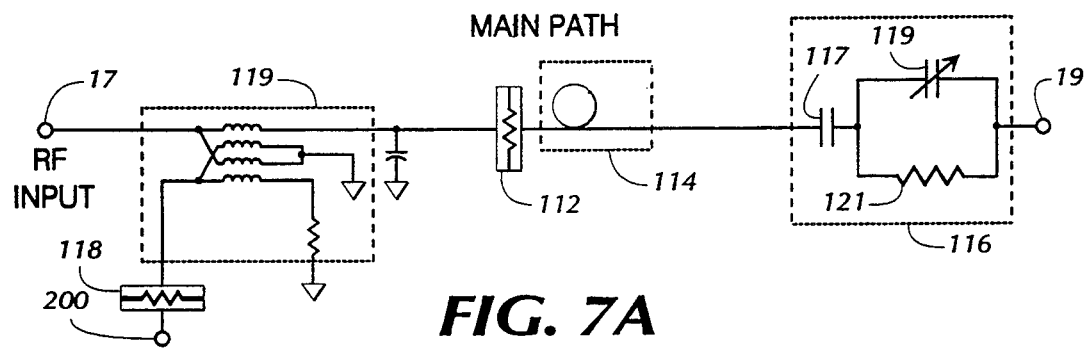

FIGS. 7A-7D illustrate detailed electrical schematic diagrams of portions of the predistortion circuit 18 illustrated in FIG. 2. In FIG. 7A, the main path is shown where the RF modulation signal is input from the modulation source and is coupled to the input 17 of the directional coupler 110. The directional coupler 110, implemented as a broadband transformer, samples a portion of the modulation signal for the distortion path and passes most of it to the main path. The portion sampled from the RF modulation signal will be used to generate a predistortion signal in the distortion path through pad 118 before it is input to the laser diode 24. A delay network 114 provides an equalization of the circuit delays the signal encounters in going through the distortion path as compared to the main path. Generally, the delay can be effected by a length coaxial cable which has a nominal impedance of 75 Ohms. This impedance is matched by matching circuit 116 to the impedance of the diode to maximize return loss. The circuit comprises a coupling capacitor 117, a variable capacitor 119, and resistor 121.

Figure 7B:
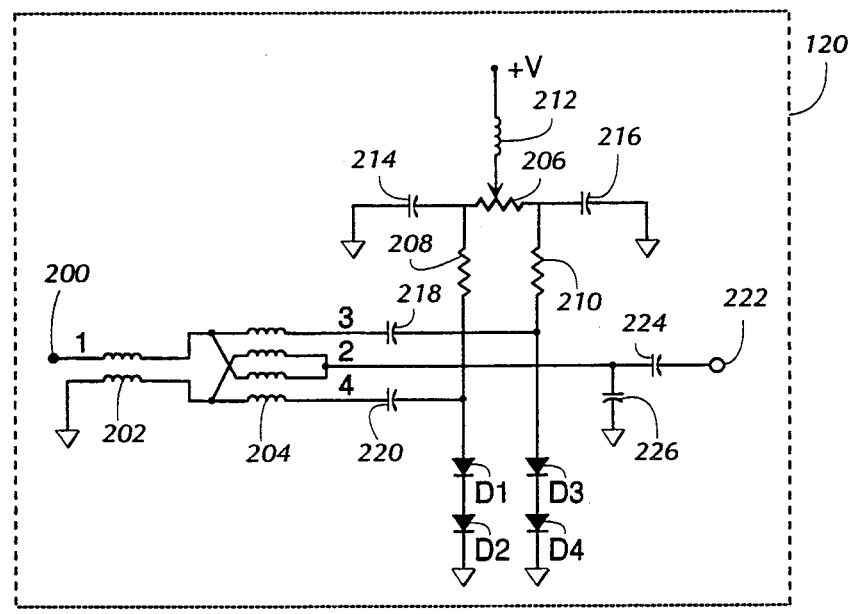

In FIG. 7B, the distortion generator 120 of the present invention includes a balun transformer 202, a hybrid transformer 204, and two pairs of nonlinear terminal devices, i.e., diodes D1, D2 and D3, D4. A DC bias for one diode pair D1, D2 is generated from one terminal of a potentiometer 206 through a resistor 208 and a DC bias for the other diode pair D3, D4 is generated from the other terminal of the potentiometer 206 through a resistor 210. The variable wiper of the potentiometer 206 provides a common current for the potentiometer 206 by its connection to the power supply +V through an inductor 212 which acts as an RF choke. Capacitors 214, 216, which are connected at the junction between the terminals of the potentiometer 206 and the terminals of the resistors 208, 210, respectively and ground, couples any RF energy which leaks past the resistors to ground. One pair of diodes D1, D2 is fed with an inphase RF signal output from port 3 of the hybrid transformer 204 through a coupling capacitor 218. The other pair of diodes D3, D4 is fed with an out-of-phase RF signal output from port 4 of the hybrid 204 through a coupling capacitor 220. The output 222 of the distortion generator 120 is fed through a coupling capacitor 224 and filter capacitor 226 from port 2 of the hybrid 204.

Because the ports 1,2 and 3,4 of a hybrid 204 form conjugate pairs, there is a cancellation of unwanted distortion products and an enhancement of other desirable distortion products at one port. The modulation signals modulate the bias currents of the diode pairs. The outputs of the diode pairs D1, D2 and D3, D4 are reflected back to the transformer through the ports 3 and 4, respectively. Each diode pair signal contains the fundamental frequency f1 of the channel frequencies and distortion products including harmonics 2f1, 3f1, 4f1, ... nf1, etc. and intermodulation products (f1+f2) ... (f1+fn), (f1−f2) ... (f1−fn), etc. The signal to port 3 is 180° out of phase with the signal to port 4 and can be viewed as −f1, +2f1, −3f1, +4f1, etc. and −(f1+f2), −(f1−f2), etc.

Because the diode pairs are driven 180° out of phase and connected to conjugate ports, the even order products of the two distortion product signals are in phase at ports 3 and 4 and the odd order products (and the fundamental) are out of phase at ports 3 and 4. The inphase signals add and appear at port 2 while the out of phase signals add and appear at port 1. However, very little, if any, of the inphase signals appear at port 1 and very little, if any, of the out-of-phase signals appear at port 2 because of the isolation of the hybrid. Thus, if the distortion generator output is taken from port 2, the distortion is primarily the second order component with the substantial cancellation of the fundamental and the suppression of the third and other odd ordered components. The distortion signal further includes a square law characteristic because of the exponential nature of the diodes.

With reference now to FIG. 7C, the directional coupler 122 is shown as a broadband transformer 230 which passes equal amounts of the distortion signal generated from the distortion generator 120 to the inphase leg and to the quadrature phase leg of the distortion path. The inphase leg initiates with the inversion network 124. The choice for the inversion of the distortion signal to the inphase leg is provided by a transformer 232, a set of terminals 1-4, and jumpers J1A, J1B. The transformer 232 supplies an inverted form of the signal from winding 234 when jumper J1B is in position connecting terminals 3-4 and jumper J1B connects terminals 1-2. The transformer 232 supplies the non-inverted form of the signal through winding 236 when the jumper J1A connects terminals 2-3 and jumper J1B connects terminals 1-4.

An NPN transistor Q1 with its associated circuitry comprises a buffer amplifier for an inphase amplitude adjustment network 128. The resistors 242, 244 are connected between the collector and the positive voltage supply +V, while resistor 246 and inductor 248 are connected between the emitter and the negative voltage supply, −V. Capacitors 250, 252 are used to decouple the resistors from the RF distortion signal. A resistive divider, comprising resistors 238,240, provides a path for the distortion signal to the base of the transistor Q1. The output of the buffer amplifier Q1 is coupled by capacitor 254 to a frequency dependent amplitude adjustment network.

The frequency dependent network comprises the serial connection of a capacitor 256, inductor 258, potentiometer 260, inductor 262, and capacitor 264 between the output of the buffer amplifier and ground. The network has the same frequency dependent components on each side of the potentiometer 260. This produces a flexible network having a frequency response across the bandwidth of the distortion signal which is substantially flat when the potentiometer wiper is in the middle of its range. The response curve of the network will tilt up, with the slope being dependent upon the distance the wiper is set from center in one direction, or the equalization curve will tilt down, with the slope being dependent upon the distance the wiper is set from center position in the other direction. An overall amplitude adjustment to the distortion signal is then provided by the serial connection of resistor 266, potentiometer 268, and resistor 270 connected between the output of the buffer amplifier and ground. The potentiometer 268 is adjusted to vary the overall level of the distortion signal to that produced by the particular laser diode in use in the transmitter.

The distortion signal after amplitude adjustment is amplified by another buffer amplifier comprising a GaAsFET Q2 and its associated circuitry. The GaAsFET Q2 is connected as a common source amplifier with its gate coupled to the output from the frequency dependent adjusting circuitry at the wiper of potentiometer 268, its source drain connected to the positive supply +V through resistors 280, 282 and its source coupled to a temperature compensated negative supply through resistor 272 and inductor 274. Capacitors 276, 278, and 284 decouple the RF signal from the bias circuitry.

The amplitude adjustment as a function of frequency can be used to correct similar distortion in the laser diode or the optical amplifier, or both simultaneously. While a relatively noncomplex amplitude function has been shown, it is evident that more complicated functions could be generated.

The quadrature phase leg of the distortion path initiates at the inversion transformer 290 and a set of terminals 1–4 which are connected with a set of jumpers J2A, J2B. The transformer 290 supplies an inverted form of the distortion signal from winding 292 when jumper J2B connects terminals 3–4 and jumper J2A connects terminals 1–2. A non-inverted form of the distortion signal through winding 294 is supplied when jumper J2A connects terminals 1–3 and jumper J2B connects terminals 2–4. The inversion allows the phase adjustment signal to be either leading or lagging as necessary.

The quadrature phase leg comprises a fixed gain buffer amplifier comprising GaAsFET Q3, a differentiator comprising inductor 302, and a variable gain buffer amplifier comprising GaAsFET Q4. The GaAsFET Q3 is connected as a common source amplifier with its drain connected to the positive supply +V through resistor 294 and inductor 296, its source connected through resistor 298 to a temperature compensated negative supply, and its gate to the output of the inversion transformer 290. Resistor 297 provides a voltage signal from the distortion signal. Capacitors 299, 301 decouple the RF signal from the bias circuitry. The inductor 302, which is coupled between ground and the output of the fixed gain buffer amplifier, forms a phase shifting or differentiation network. The differentiator shifts a portion of the incoming signal 90° in the leading direction and varies its amplitude as a function of frequency. The amplitude versus frequency function depends on the value of inductor 302 and is non-complex. However, much more complex functions can be utilized if needed. This leading signal is output from the junction between the coupling capacitor 300 and inductor 302 to the input of a variable gain buffer amplifier comprising GaAsFET Q4 and its associated circuitry.

The variable gain buffer amplifier is configured as a common source amplifier with its drain connected to the positive supply +V through resistors 280, 282, its source connected to the temperature compensated negative source through potentiometer 306 and resistor 308, and its gate connected to the junction of capacitor 300 and inductor 302. By varying the potentiometer 306, the gain of Q4 varies which causes the amplitude of the signal which is combined with the distortion signal in the inphase leg of the distortion path. This amplitude change of the quadrature phased signal is used to vary the phase of the distortion signal as will be more fully discussed hereinafter.

Subsequent to the combination of the inphase and quadrature phase signals, the distortion signal is coupled through coupling capacitor 312 to the matching network 132. The matching network comprises the coupling 312 capacitor and the parallel connection of a resistor 316 and a variable capacitor 314. This matching network 182 matches the low input impedance of the laser diode 24 with the output impedance of the predistortion circuit 132 so that the predistortion signal is efficiently coupled (maximize return loss) to the laser diode 24. When the input RF signal is impressed on the bias current of the laser diode, distortion will be generated because of the inherent nonlinearities of the device and its optical link. By also modulating the laser bias current with a predistortion signal which substantially replicates this actual distortion substantially all of the distortion in the system may be canceled.

FIG. 7D illustrates the circuit providing bias current to the buffer amplifiers. A current source 251 is connected to a control circuit 253 to provide a Bias current signal to the amplifiers. A temperature sensitive element 255, preferably a thermister or the like, varies the impedance of control 253 in a temperature dependent manner. The change in impedance varies the bias current in similar manner so that the operating points of the amplifiers are maintained constant for ambient temperature changes.

One of the primary distortion components is the LI nonlinearity. If the LI characteristics is superlinear, the distortion signal should be combined with the modulation signal out of phase so that they subtract. If the LI characteristics is sublinear, the distortion signal should be combined with the modulation signal inphase so that they add. Jumpers for the inversion transformer 232 are located accordingly. However, the phase of the distortion signal may still be either leading or lagging the actual distortion. For actual leading phase of the laser generated distortion, the quadrature signal is set to be out-of-phase so it will supply a 90° lag overall to adjust or cancel the phase error of the actual distortion. For actual lagging phase of the laser generated distortion, the quadrature signal is set to be inphase and thus lead the distortion. Depending upon the distortion, jumpers on inversion transformer 290 are located accordingly.

Figure 8C:
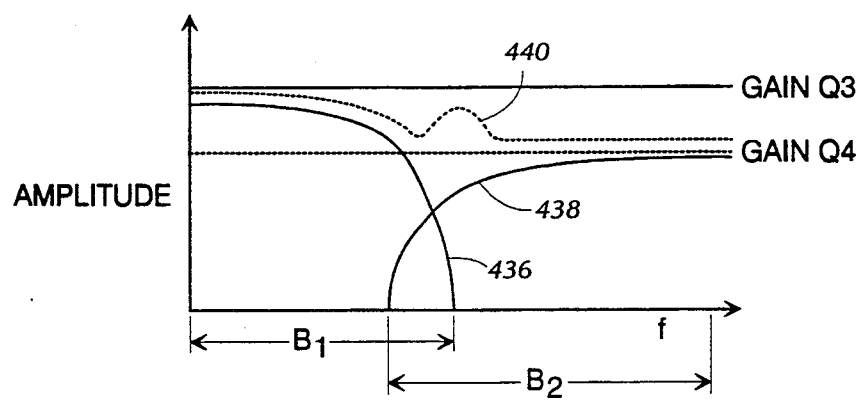
FIGS. 8A–8C are detailed schematic block diagrams of the adjustment networks for the predistortion circuit illustrated in FIG. 3.
Figure 8A:
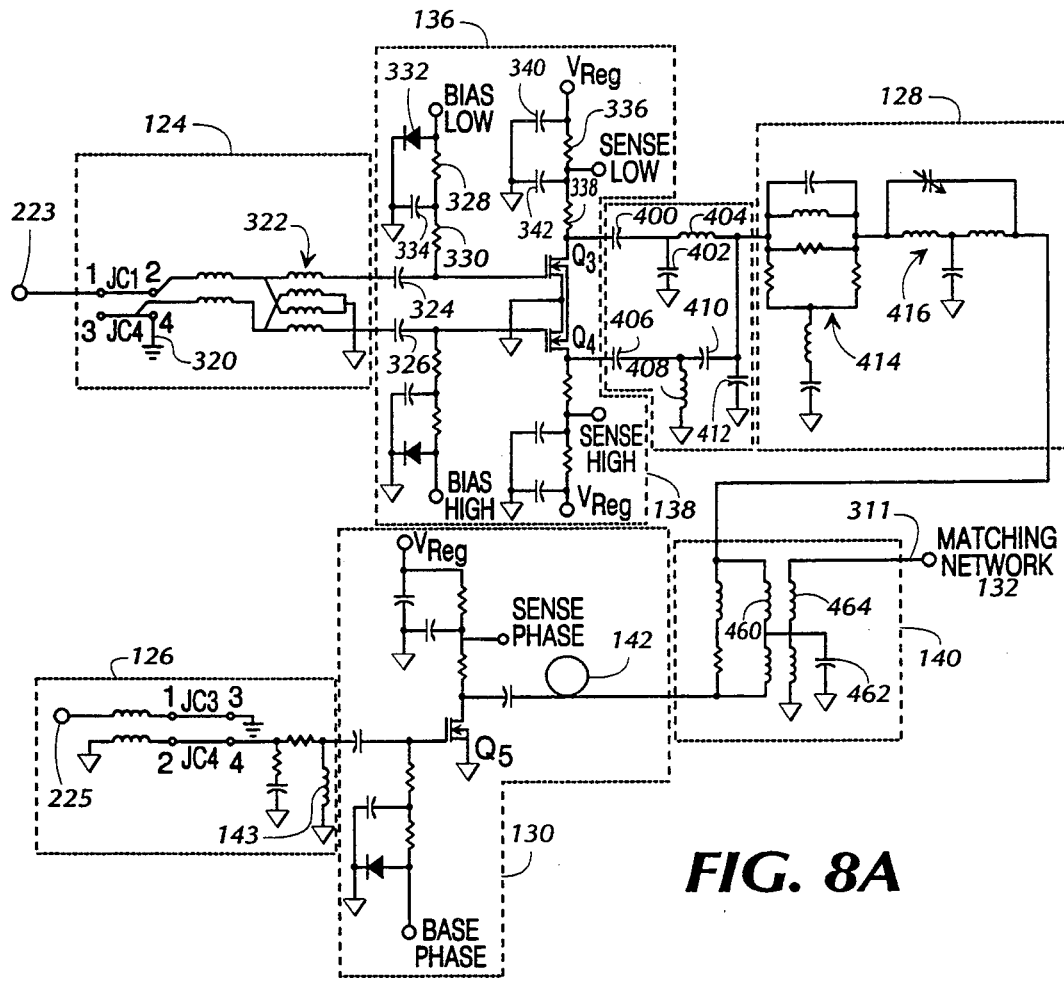
Figure 8B:
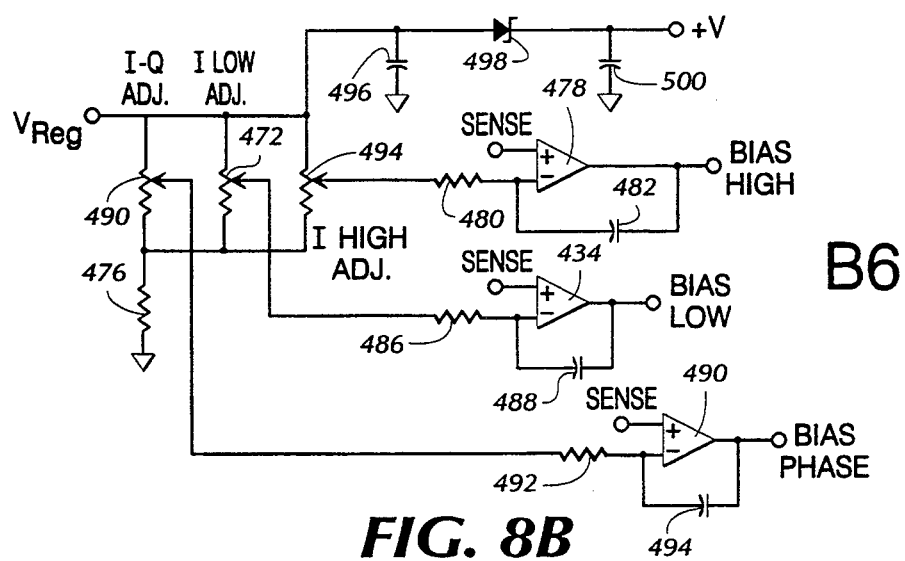

FIGS. 8A and 8B illustrate a detailed schematic diagram of the distortion signal adjustment networks 123 for the second embodiment of the predistortion network. The networks receive the distortion signal from coupler 122 at terminals 223, 225 and output an adjusted distortion signal to network 132 at terminal 311. The invertor 124, because it is a dual output invertor, uses a set of terminals 1–4 connected to a hybrid transformer 322 to provide a dual output and inverting capability. The hybrid 322 provides one output through coupling capacitor 324 to the gate of a buffer amplifier comprising GaAsFET Q3 and its associated circuitry. The other output of the hybrid 322 is coupled by a coupling capacitor 326 to the gate of a buffer amplifier comprising GaAsFET Q4 and its associated circuitry. Each buffer amplifier is identical in configuration and only one will be described for the purpose of clarity.

Each buffer amplifier has a similar common source configuration of a GaAsFET with a bias network and an output network. To maintain the gain and operating point of the device substantially constant, the current is controlled to the bias network while sensing the current from the output network. The bias network comprises a pair of series resistors 328, 330 connected between a bias source and the gate of the GaAsFET. A diode 332 is connected between a bias source and ground to prevent the gate from being driven too far positive. The bias network provides a controllable voltage based upon current, and thus a controlled gain for Q3. A decoupling capacitor 334, connected between the junction of resistors 328, 330 and ground, shunts any RF away from the bias network.

The output network comprises the series combination of resistors 336, 338 which are connected between the drain terminal of GaAsFET Q3 and the regulated supply voltage Vreg. The source terminal of the GaAsFET Q3 is connected to ground. Decoupling capacitors 340, 342 direct any RF energy away from the output network to ground. A current sensing terminal sense low at the junction of resistors 336, 338 provides a measurement of the output current which is representative of the gain of the GaAsFET Q3. By controlling the gate bias based upon a measurement of the output current, a closed loop can be established to maintain the gain of the buffer amplifier substantially constant even in view of power supply variation and temperature changes. Further, this stable gain may be adjusted by varying the set point of the closed loop.

The buffer amplifier including GaAsFET Q3 feeds a low pass filter comprising the series combination of a capacitor 400 and an inductor 404 and a parallel capacitor 402 connected between the junction of the capacitor 400 and inductor 404 and ground. The buffer amplifier including the GaAsFET Q4 feeds a high pass filter including the series combination of a capacitor 406, a capacitor 410 and the parallel capacitor 408 connected between the junction of the two series capacitors. The outputs of the low pass filter and high pass filter are combined at a filter capacitor 412 before being fed to the equalizer 128.

The low pass filter frequency response is illustrated in FIG. 8D, which illustrates a band $B_1$ which covers the lower frequencies of the CATV bandwidth. The high pass filter has a frequency response which covers a bandwidth $B_2$ which is generally the higher frequencies of the CATV bandwidth. Because these bands tend to overlap in a non-exclusive fashion, the total frequency response curve core 40 may have some areas of discontinuity. The filters 414 and 416 of the equalizer 128 smooth these discontinuities to provide a smoothly changing amplitude response as a function of frequency. The gain of the buffer amplifiers is independently set and therefore a up-tilt in frequency or a down-tilt in frequency response may be provided by the correct gain adjustment. The advantages of different amplitude versus frequency adjustments for separate bands is more fully described in copending application, A-245, entitled "Predistortion Method and Apparatus", by the same inventor and assignee, the disclosure of which is hereby incorporated by reference.

The output of the equalizer 128 is combined with the output of the phaser adjuster after it is delayed by the length of coaxial cable 142 in the combiner 140. The combiner 140 comprises a broad band transformer which is tapped to provide impedance transformations. A variable capacitor 462 is connected between the primary coils of the transformer and can be adjusted to optimize return loss.

The control of the gain of each of the buffer amplifiers for the high pass filter, low pass filter and the phase adjuster are more fully illustrated in FIG. 8B. The regulated voltage Vreg is provided to a set of three potentiometers 470, 472 and 474, which are then terminated at ground through a common resister 476. The potentiometers 470, 472 and 474 generate the set points for the buffer amplifier of the phase adjuster, the buffer amplifier of the low pass filter and the buffer amplifier of the high pass filter, respectively. Each set point voltage is provided to a inverting input of an operational amplifier which is configured as a differential amplifier. In the figure, operational amplifier 478, receives the high pass filter set point voltage from potentiometer 474 through current limiting resistor 480.

The operational amplifier 478 has a feedback capacitor 482 connected between its output and inverting input. The output current sensing terminal sense phase for the buffer amplifier including GaAsFET Q5 is connected to the non-inverting input. The output of the amplifier provides current to the bias terminal bias phase of the buffer amplifier. When the output current of the buffer amplifier rises above that set by the voltage of the potentiometer 474, such action will be sensed by the current sensing terminal and cause the operation amplifier, to lower the bias current to the buffer amplifier. Therefore, throughout temperature changes and voltage supply variations, the gain and therefore the frequency response of the distortion adjustment networks will remain substantially constant. The feedback controls allow a facile way of adjusting the gains of these networks independently without the loss of maintaining control of the circuits.

Similarly the operational amplifier 484 has its non-inverting input connected to the current sensing terminal sense low of the buffer amplifier for the low pass filter. The inverting terminal for the amplifier 484 is connected to the potentiometer 472 through current limiting resistor 486, and to its output through integrating capacitor 488. The output of the operational amplifier 484 is connected to the bias terminal bias low for the buffer amplifier including GaAsFET Q3. Moreover, the operational amplifier 490 has its non-inverting input connected to the current sensing terminal sense high of the buffer amplifier including GaAsFET Q5. The inverting input of amplifier 490 is connected to the potentiometer 470 through the current limiting resistor 492 and to its output through integrating capacitor 494. The output of the operational amplifier is connected to the bias terminal bias high for the buffer amplifier including GaAsFET Q5.

While there has been shown and described the preferred embodiments of the invention, it will be evident to those skilled in the art that various modifications may be made thereto without departing from the spirit and scope of the invention which is set forth in the appended claims.

What is claimed is:

1. A predistortion apparatus for a nonlinear optical transmission system including a laser and an optional link having a main signal path and a distortion signal path which are applied to the laser to modulate the optical intensity of its output and provide a modulated optical signal, said circuit comprising:

a coupler dividing an RF input signal into the main path and the distortion path;

a distortion generator located in the distortion path, operative to provide a distortion signal from said RF input signal;

a first adjustment network coupled to said distortion generator operative to correct the amplitude of the distortion signal by modulating the laser with the RF input signal over the optical link; and a second adjustment network coupled to said distortion generator in parallel with the first adjustment network to adjust the phase of the distortion signal to substantially match phase distortion generated by modulating the laser with the RF input.

2. A predistortion apparatus as set forth in claim 1 wherein said second adjustment network includes:

means for adjusting the phase of the distortion signal as a function of frequency.

3. A predistortion apparatus as set forth in claim 2 wherein said second adjustment network includes:

means for adjusting the phase of the distortion signal without substantially adjusting the amplitude of the distortion signal.

4. A predistortion apparatus as set forth in claim 3 wherein said first adjustment network includes:

means for adjusting the amplitude of the distortion signal without substantially adjusting the phase of the distortion signal.

5. A predistortion apparatus as set forth in claim 1 wherein said first adjustment network includes:

means for adjusting the amplitude of the distortion signal as a function of frequency.

6. A predistortion apparatus for a nonlinear optical transmission system including a laser diode and an optical link having a main signal path and a distortion signal path which are applied to the laser diode to modulate the optical intensity of its output and provide a modulated optical signal, said circuit comprising:

means for dividing an RF input signal into the main path and the distortion path;

means, located in the distortion path, for generating a distortion signal from said RF input signal;

first means coupled to said distortion signal generating means for correcting the distortion signal to substantially match the distortion generated by modulating the laser diode with the RF input signal; and second means coupled to said distortion signal generating means in parallel with said first means for correcting the distortion signal to substantially match the distortion generated by transmitting the modulated optical signal over the optical link.

7. A predistortion apparatus as set forth in claim 6 wherein said first correcting means includes:

means for adjusting the amplitude of the distortion signal.

8. A predistortion apparatus as set forth in claim 7 wherein said amplitude adjusting means includes:

means for adjusting the amplitude of the distortion signal as a function of frequency.

9. A predistortion apparatus as set forth in claim 8 wherein said amplitude adjusting means includes:

means for adjusting the amplitude of the distortion signal without substantially adjusting the phase of the distortion signal.

10. A predistortion apparatus as set forth in claim 6 wherein said second correcting means includes:

means for adjusting the phase of the distortion signal.

11. A predistortion apparatus as set forth in claim 10 wherein said phase adjusting means includes:

means for adjusting the phase of the distortion signal as a function of frequency.

12. A predistortion apparatus as set forth in claim 11 wherein said phase adjusting means includes:

means for adjusting the phase of the distortion signal without substantially adjusting the amplitude of the distortion signal.

13. A predistortion apparatus as set forth in claim 6 wherein said first correcting means includes:

means for adjusting the phase of the distortion signal.

14. A predistortion apparatus as set forth in claim 13 wherein said phase adjusting means includes:

means for adjusting the phase of the distortion signal as a function of frequency.

15. A predistortion apparatus as set forth in claim 14 wherein said phase adjusting means includes:

means for adjusting the phase of the distortion signal without substantially adjusting the amplitude of the distortion signal.

16. A predistortion apparatus as set forth in claim 6 wherein said second correcting means includes:

means for adjusting the amplitude of the distortion signal.

17. A predistortion apparatus as set forth in claim 16 wherein said amplitude adjusting means includes:

means for adjusting the amplitude of the distortion signal as a function of frequency.

18. A predistortion apparatus as set forth in claim 17 wherein said amplitude adjusting means includes:

means for adjusting the amplitude of the distortion signal without substantially adjusting the phase of the distortion signal.

19. A predistortion apparatus for a nonlinear optical transmission system including a laser diode and an optical link with an optical amplifier, the system having a main signal path and a distortion signal path which are applied to the laser diode to modulate the optical intensity of its output and provide a modulated optical signal, said circuit comprising:

means for dividing an RF input signal into the main path and the distortion path;

means, located in the distortion path, for generating a distortion signal from said RF input signal;

first means coupled to said distortion signal generating means for correcting the distortion signal to substantially match the distortion generated by transmitting the modulated optical signal through the optical amplifier; and second means coupled to said distortion signal generating means in parallel with said first means for correcting the distortion signal to substantially match the distortion generated by transmitting the modulated optical signal over the optical link.

20. A predistortion apparatus as set forth in claim 19 wherein said first correcting means includes:

means for adjusting the amplitude of the distortion signal.

21. A predistortion apparatus as set forth in claim 20 wherein said amplitude adjusting means includes:

means for adjusting the amplitude of the distortion signal as a function of frequency.

22. A predistortion apparatus as set forth in claim 21 wherein said amplitude adjusting means includes:

means for adjusting the amplitude of the distortion signal without substantially adjusting the phase of the distortion signal.

23. A predistortion apparatus as set forth in claim 19 wherein said second correcting means includes:

means for adjusting the phase of the distortion signal.

24. A predistortion apparatus as set forth in claim 23 wherein said phase adjusting means includes:
means for adjusting the phase of the distortion signal as a function of frequency.

25. A predistortion apparatus as set forth in claim 24 wherein said phase adjusting means includes:
means for adjusting the phase of the distortion signal without substantially adjusting the amplitude of the distortion signal.

26. A predistortion apparatus as set forth in claim 19 wherein said first correcting means includes:
means for adjusting the phase of the distortion signal.

27. A predistortion apparatus as set forth in claim 26 wherein said phase adjusting means includes:
means for adjusting the phase of the distortion signal as a function of frequency.

28. A predistortion apparatus as set forth in claim 27 wherein said phase adjusting means includes:
means for adjusting the phase of the distortion signal without substantially adjusting the amplitude of the distortion signal.

29. A predistortion apparatus as set forth in claim 19 herein said second correcting means includes:
means for adjusting the amplitude of the distortion signal.

30. A predistortion apparatus as set forth in claim 29 wherein said amplitude adjusting means includes:
means for adjusting the amplitude of the distortion signal as a function of frequency.

31. A predistortion apparatus as set forth in claim 30 wherein said amplitude adjusting means includes:
means for adjusting the amplitude of the distortion signal without substantially adjusting the phase of the distortion signal.

32. A predistortion apparatus for a nonlinear optical transmission system including a laser diode and an optical link with an optical amplifier, the system having a main signal path and a distortion signal path which are applied to the laser diode to modulate the optical intensity of its output and provide a modulated optical signal, said circuit comprising:
means for dividing an RF input signal into the main path and the distortion path;
means, located in the distortion path, for generating a distortion signal from said RF input signal;
first means coupled to said distortion signal generating means for correcting the distortion signal to substantially match the distortion generated by modulating the laser diode with the RF input signal; and
second means coupled to said distortion signal generating means in parallel with said first means for correcting the distortion signal to substantially match the distortion generated by transmitting the modulated optical signal through the optical amplifier.

33. A predistortion apparatus as set forth in claim 32 wherein said first correcting means includes:
means for adjusting the amplitude of the distortion signal.

34. A predistortion apparatus as set forth in claim 33 wherein said amplitude adjusting means includes:
means for adjusting the amplitude of the distortion signal as a function of frequency.

35. A predistortion apparatus as set forth in claim 34 wherein said amplitude adjusting means includes:
means for adjusting the amplitude of the distortion signal without substantially adjusting the phase of the distortion signal.

36. A predistortion apparatus as set forth in claim 32 wherein said second correcting means includes:
means for adjusting the phase of the distortion signal.

37. A predistortion apparatus as set forth in claim 36 wherein said phase adjusting means includes:
means for adjusting the phase of the distortion signal as a function of frequency.

38. A predistortion apparatus as set forth in claim 37 wherein said phase adjusting means includes:
means for adjusting the phase of the distortion signal without substantially adjusting the amplitude of the distortion signal.

39. A predistortion apparatus as set forth in claim 32 wherein said first correcting means includes:
means for adjusting the phase of the distortion signal.

40. A predistortion apparatus as set forth in claim 39 wherein said phase adjusting means includes:
means for adjusting the phase of the distortion signal as a function of frequency.

41. A predistortion apparatus as set forth in claim 40 wherein said phase adjusting means includes:
means for adjusting the phase of the distortion signal without substantially adjusting the amplitude of the distortion signal.

42. A predistortion apparatus as set forth in claim 32 wherein said second correcting means includes:
means for adjusting the amplitude of the distortion signal.

43. A predistortion apparatus as set forth in claim 42 wherein said amplitude adjusting means includes:
means for adjusting the amplitude of the distortion signal as a function of frequency.

44. A predistortion apparatus as set forth in claim 43 wherein said amplitude adjusting means includes:
means for adjusting the amplitude of the distortion signal without substantially adjusting the phase of the distortion signal.

* * * * *